Feb. 27, 1923.
J. T. THOMPSON
ADJUSTABLE SAW
Filed June. 27, 1922
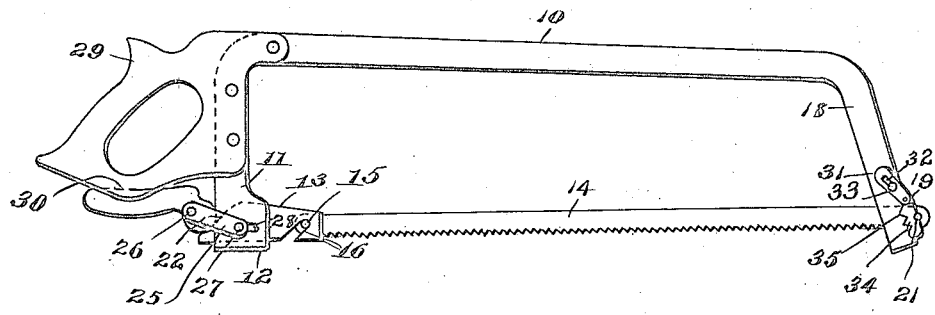
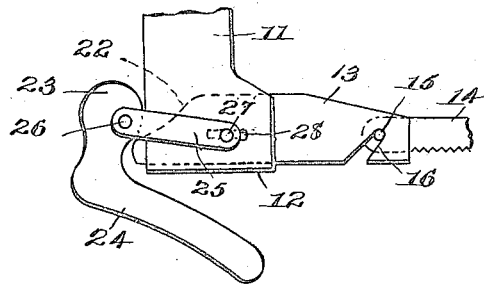 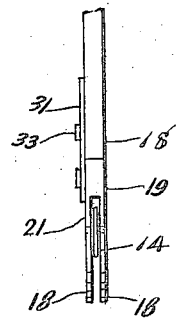
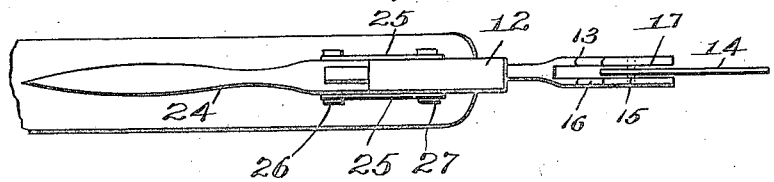
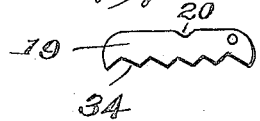
Inventor
J. T. Thompson
By Shreve, Crowe & Gordon
Attys.

Patented Feb. 27, 1923.

1,446,674

UNITED STATES PATENT OFFICE.

JOHN THOMAS THOMPSON, OF AUGUSTA, GEORGIA.

ADJUSTABLE SAW.

Application filed June 27, 1922. Serial No. 571,287.

*To all whom it may concern:*

Be it known that I, JOHN THOMAS THOMPSON, a citizen of the United States, residing at Augusta, in the county of Richmond and State of Georgia, have invented new and useful Improvements in Adjustable Saws, of which the following is a specification.

An object of this invention is to provide a meat saw or saw of the detachable blade type embodying novel means for quickly and expeditiously attaching and detaching the blade from the frame as desired.

Another object of the invention is to provide means for holding the saw blade absolutely taut when in operative position, at the same time preventing any lateral or twisting movement of the blade causing it to buckle or break.

A further and important object of the invention is to provide means for adjusting the blade to change its pitch, thereby further regulating the cutting depth of the saw.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Figure 1 is a side elevation of the frame with the parts in locked position;

Figure 2 is an enlarged detail view of the locking device with the parts in released position;

Figure 3 is a detailed view of the adjustable holder at the outer end of the frame;

Figure 4 is a bottom plan view of the saw tensioning lever; and

Figure 5 is a detailed view in side elevation of the adjustable member showing the locking teeth thereof.

In carrying out the invention the U-shaped frame 10 of the saw is provided at the lower end of its arm 11 with a transverse guide 12 in which is slidably mounted a holder 13 for one end of the saw blade 14, the cross pin 15 of the latter engaging in the inclined notches 16, as shown, the holder being bifurcated as at 17 to accommodate the end of the blade. The opposite end of the blade passes through the bifurcated end of arm 18 and between the jaws of a similarly bifurcated holder 19, the latter provided with notches 20 to accommodate the cross pins 21 of the blade.

Holder 13 is provided at one end with a cam surface 22 against which bears a portion of the cam 23 of a locking lever 24, the same being pivotally connected with holder 13 by means of a pair of links 25. Links 25 are eccentrically pivoted to the cam as indicated at 26, and have their other ends connected with the pivot pins 27 of the holder, which pins work in slots 28 in the sides of guide 12, so that when the lever is in released position, as shown in Figure 2, pins 27 will be disposed at the inner ends of the slots with the holder extended inwardly of arm 11. In this position of the holder, the cross pin 15 of the blade can be readily engaged in or disengaged from notches 16.

When lever 24 is raised upwardly, the eccentrically pivoted links will pull slide 13 backwardly, thereby placing the saw blade under tension and firmly holding the latter in position, a portion of the cam at the same time binding against the cam surface 22 of the slide so as to prevent any relaxation on the part of the tensioned blade as pins 26 move past dead center. This is an important feature of the invention as it enables the saw blade to be held taut and under proper tension at all times, whereas in other locking devices of a similar character there is usually a slight relaxation of the blade after the locking lever is brought to rest, the blade being as a consequence thereof, not tensioned to the proper degree, and hence liable to snap off and break while in use.

In the present invention the locking lever not only tensions the blade, but also maintains it firmly in position within the frame, and, if desired, the handle 29 of the frame may be recessed or notched on the under side as shown at 30 to accommodate lever 24 so that the latter will be held against accidental displacement.

In order that the saw blade may be raised or lowered in the frame to adjust its pitch or angle of inclination with respect to the object being cut and, hence, to regulate the depth of the cut, holder 19 is made adjustable on arm 18. This holder is supported by a link 31, which is slotted longitudinally as shown at 32 to engage over a guide pin 33 on the arm, and the inner faces of the bifurcations of the holder are provided with teeth 34 having engagement in notches 35 on the adjacent face of arm 18. By adjusting holder 19 up or down on the arm, the end of the saw blade will be correspondingly raised or lowered, and the cutting edge of the blade thus set at any selected angle to the object. This adjustment is made when lever 24 is in released position, and it will thus be seen that when the lever is again locked the tension of the blade will retain the teeth of the adjustable holder 19 in engagement with selected notches 33 of the frame. The frame may be notched to any suitable extent to provide a comparatively wide range of adjustment and the slot in link 31 lengthened accordingly.

In practice, I have found that the form of my invention illustrated in the accompanying drawings and referred to in the above description, as the preferred embodiment, is the most efficient and practical; yet realizing the conditions concurrent with the adoption of my device will necessarily vary, I desire to emphasize that various minor changes in details of construction, proportion and arrangement of parts, may be resorted to within the scope of the appended claims without departing from or sacrificing any of the principles of my invention.

Having thus described my invention, and without enumerating variations and equivalents, what I desire protected by Letters Patent is as set forth in the following claims:

1. A saw holder comprising a U-shaped frame presenting a guide at one end, a saw holder slidable in said guide, said holder presenting a cam surface and a locking lever connected with said holder and presenting a cam element for engagement with the frame and the cam surface of the holder, said cam element being rotatable about an eccentric axis for binding engagement with the said cam surface, in the locking position of the lever.

2. A saw holder comprising a U-shaped frame having means at one end for detachably connecting a saw blade thereto, and means cooperating with the other end of the frame for adjustably connecting the blade thereto, said adjustable means comprising a holder for the end of the blade having teeth engageable in notches in the end of the frame, and a supporting link carried by the holder and slidably engaged with a guide element of the frame.

3. A saw comprising a frame embodying a back and front and rear leg members, a front leg member having a slot provided in its end, a saw blade having one end seated in said slot and provided with cross pins adjacent its ends to retain the same in position, an adjustable block connected to the forward leg by means of a slotted link, said link being positioned between the slotted leg member and said cross pin for vertically adjusting the saw blade, a tensioning device carried by the rear leg member and connected to the other end of the saw blade, and a handle carried by the frame.

JOHN THOMAS THOMPSON.

Witnesses:
L. C. WILSON,
W. A. LEE.